US008450241B2

(12) United States Patent
Ishida

(10) Patent No.: US 8,450,241 B2
(45) Date of Patent: May 28, 2013

(54) FILM TRANSFER SHEET AND INTERMEDIATE TRANSFER RECORDING MEDIUM

(75) Inventor: Tadahiro Ishida, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 992 days.

(21) Appl. No.: 12/211,228

(22) Filed: Sep. 16, 2008

(65) Prior Publication Data

US 2009/0081389 A1 Mar. 26, 2009

(30) Foreign Application Priority Data

Sep. 19, 2007 (JP) ................................ 2007-241794
Jan. 31, 2008 (JP) ................................ 2008-021735

(51) Int. Cl.
*B44F 1/10* (2006.01)
*B32B 33/00* (2006.01)

(52) U.S. Cl.
USPC .......... 503/227; 428/29; 428/32.39; 428/41.3

(58) Field of Classification Search
USPC ......................... 428/29, 32.39, 41.3; 503/227
See application file for complete search history.

(56) References Cited

U.S. PATENT DOCUMENTS 3,922,435 A * 11/1975 Asnes .......................... 428/349
5,494,885 A * 2/1996 Kudo et al. .................. 503/227
6,489,266 B1 * 12/2002 Kurokawa et al. ............ 503/227
2002/0151438 A1 * 10/2002 Mihara et al. ................ 503/227

FOREIGN PATENT DOCUMENTS

JP 62-238791 10/1987
JP 2000-71626 3/2000
JP 2000-80844 3/2000
JP 2000-167970 A 6/2000
JP 2000-238439 9/2000
JP 2001-030641 A 2/2001
JP 2005-035122 A 2/2005

* cited by examiner

*Primary Examiner* — Gerardo Higgins
*Assistant Examiner* — Sathavaram I Reddy
(74) *Attorney, Agent, or Firm* — Ladas & Parry LLP

(57) ABSTRACT

A film transfer sheet including a sheet substrate provided with a layer via a resin layer and a peelable transparent sheet provided with an adhesive layer. The sheet substrate and the peelable transparent sheet are laminated together such that the layer is overlapped on the peelable transparent sheet and peeling is designed to occur between the layer and the peelable transparent sheet so as to transfer the peelable transparent sheet provided with the adhesive layer to a transfer-receiving member. The resin layer includes as an essential component a pressure-sensitive adhesive having a storage elastic modulus of $3.0\times10^5$ Pa to $1.2\times10^6$ Pa at a temperature of 130° C. to 150° C. Also provided is an intermediate transfer recording medium including a sheet substrate provided with a layer via resin layer and a peelable transparent sheet provided with a dye receptive layer, in which the sheet substrate and the peelable transparent sheet are laminated together.

7 Claims, 4 Drawing Sheets

FILM TRANSFER SHEET AND INTERMEDIATE TRANSFER RECORDING MEDIUM

BACKGROUND OF THE INVENTION

1. Field of the Invention

The present invention relates to a film transfer sheet and intermediate transfer recording medium capable of forming a protective layer and/or an image on a transfer-receiving member successfully.

2. Description of the Related Art

Conventionally, various thermal transfer methods have been known. In such methods, a thermal transfer sheet comprising a color transfer layer formed on a substrate sheet is heated imagewise from the back face thereof by using a thermal head or the like, to thermally transfer the above color transfer layer to the surface of a thermal transfer image-receiving sheet, thereby forming an image. These thermal transfer methods are loosely classified into two systems depending upon the structure of the color transfer layer, namely, a sublimation transfer type and a heat melting transfer type. The two systems enable the formation of a full-color image. For instance, thermal transfer sheets in three different colors of yellow, magenta and cyan or in four different colors of said three colors and, as needed, black are prepared, and each color image is overlapped on and thermally transferred to the same thermal transfer image-receiving sheet to form a full-color image. With the progresses of various hardware and software applications relating to multimedia, markets for the thermal transfer method have been broadened in the fields of full-color hard copy systems used for computer graphics, static images sent by satellite communications, digital images represented by those of CD ROMs and the like, and analog images of videos and the like.

Specific applications of the thermal transfer image-receiving sheet used in this thermal transfer method are diversified. Typical examples of the application include proof of printing, outputs of images, outputs of layout and design in CAD/CAM, output applications for various medical analysis or measuring instruments, such as CT scans and endscope cameras, substitutions for instant photographs, outputs of photographs of a face and the like in papers of identification, ID cards, credit cards and other cards, combination photographs and commemorative photographs handled in amusement facilities such as amusement parks, game centers, museums and aquariums.

When a melt transfer-type thermal transfer sheet is used to form an image, this method has a weakness that the formed image lacks in durability regarding friction resistance. When a sublimation transfer-type thermal transfer sheet is used to form an image, gradational images such as photographs of a face can be formed precisely. However, this method has a weakness that, unlike an image formed by usual printing ink, the formed image lacks in durability regarding, for example, weatherability, friction resistance and chemical resistance. To solve the problem, a protective layer thermal transfer sheet having a thermal transfer resin layer is overlapped on a thermal transfer image and the thermal transfer resin layer having transparency is transferred using a thermal head, heating roll or the like to form a protective layer on the image. For example, as disclosed in Japanese Patent Application Laid-Open (JP-A) Nos. 2000-80844 and 2000-71626, it is proposed to use a protective layer thermal transfer sheet to transfer and form a protective layer on a thermal transfer image.

Along with the diversification of applications of the thermal transfer image-receiving sheet, there has been an increased demand for forming a thermal transfer image on an optional subject. In general, a special thermal transfer image-receiving sheet having a receptive layer formed on a substrate is used as the subject to form a thermal transfer image thereon. However, there are limitations to the substrate, etc. Accordingly, such a transferring method as disclosed in JP-A No. 62-238791 is proposed, in which using an intermediate transfer recording medium provided peelably with a receptive layer on a substrate and a thermal transfer sheet having a dye layer, a dye is transferred to the receptive layer to form an image and thereafter the intermediate transfer recording medium is heated to transfer the receptive layer to an optional transfer-receiving member.

Even in the method using the above intermediate transfer recording medium, however, a final product having an image formed thereon still has the above-mentioned weakness of lack of durability. On the other hand, JP-A No. 2000-238439 proposed an intermediate transfer recording medium in which a transparent substrate provided with a receptive layer is peelably laminated with a sheet substrate via a resin layer. More specifically, the intermediate transfer recording medium with high durability is proposed wherein, after an image is formed on the receptive layer, the transparent substrate is transferred to a transfer-receiving member together with the receptive layer when the receptive layer surface having the image formed thereon is brought into contact with the transfer-receiving member to transfer the image.

SUMMARY OF THE INVENTION

In the case of using the aforementioned protective layer thermal transfer sheet to thermally transfer a protective layer onto a thermally transferred image, the protective layer must have layer-cuttability because it must be transferred in part when it is transferred using a thermal head or a heating roll. In this case, there is a problem that it is inevitable that the protective layer is formed of a resin film with a thickness of about several microns and it is hence impossible to impart to the protective layer durability regarding, for example, strong resistance to abrasion and chemical resistance.

In the case of the above-mentioned intermediate transfer recording medium of which transparent substrate provided with the receptive layer is designed to transfer to a transfer-receiving member, depending on the resin layer used in the intermediate transfer recording medium, there arises a problem that peeling does not occur normally between the transparent substrate provided with the receptive layer and the sheet substrate when the intermediate transfer recording medium is thermally transferred to the transfer-receiving member. When an image is transferred to a transfer-receiving member, for example, there is a problem of increased force for peeling or occurrence of cohesive failure in the resin layer, resulting in the resin layer left on the transfer-receiving member.

The present invention was made in the light of the above circumstances, and it is an object of the present invention to provide a film transfer sheet and intermediate transfer recording medium capable of improving durability of an image formed on a printed product (transfer-receiving member) by thermal transfer, exhibiting excellent peelability upon transfer to the transfer-receiving member and forming a protective layer and/or an image on the transfer-receiving member successfully.

The film transfer sheet of the present invention comprises a sheet substrate provided with a layer via a resin layer and a peelable transparent sheet provided with an adhesive layer, in which the sheet substrate and the peelable transparent sheet are laminated together such that the layer is overlapped on the peelable transparent sheet and peeling is designed to occur between the layer and the peelable transparent sheet so as to transfer the peelable transparent sheet provided with the adhesive layer to a transfer-receiving member, wherein the resin layer comprises as an essential component a pressure-sensitive adhesive having a storage elastic modulus of $3.0\times10^5$ Pa to $1.2\times10^6$ Pa at a temperature of 130° C. to 150° C.

The use of the film transfer sheet of the present invention results in a structure in which the peelable transparent sheet protects a thermally transferred image formed on a transfer-receiving member via the adhesive layer. According to the present invention, unlike conventional protective layers comprising a thin film prepared by coating, the peelable transparent sheet comprising a plastic film functions as a strong protective layer along with the adhesive layer, thereby providing distinctly excellent durability to the image. Furthermore, as dynamic viscoelasticity of the resin layer constituting the film transfer sheet, a storage elastic modulus at a temperature of 130° C. to 150° C. is specified in the specific range of $3.0\times10^5$ Pa to $1.2\times10^6$ Pa. Therefore, the film transfer sheet exhibits excellent peelability when transferring the peelable transparent sheet provided with the adhesive layer to a transfer-receiving member.

The intermediate transfer recording medium of the present invention comprises a sheet substrate provided with a layer via a resin layer and a peelable transparent sheet provided with a dye receptive layer, in which the sheet substrate and the peelable transparent sheet are laminated together such that the layer is overlapped on the peelable transparent sheet and peeling is designed to occur between the layer and the peelable transparent sheet so as to transfer the peelable transparent sheet provided with the dye receptive layer to a transfer-receiving member, wherein the resin layer comprises as an essential component a pressure-sensitive adhesive having a storage elastic modulus of $3.0\times10^5$ Pa to $1.2\times10^6$ Pa at a temperature of 130° C. to 150° C.

The use of the intermediate transfer recording medium of the present invention results in a structure in which the dye receptive layer having a thermally transferred image formed thereon and the peelable transparent sheet are laminated on a transfer-receiving member. According to the present invention, the peelable transparent sheet comprising a plastic film protects the thermally transferred image formed on the transfer-receiving member. Therefore, unlike conventional protective layers comprising a thin film prepared by coating, distinctly excellent durability is provided to the image. Further, as dynamic viscoelasticity of the resin layer of the intermediate transfer recording medium, a storage elastic modulus at a temperature of 130° C. to 150° C. is specified in the specific range of $3.0\times10^5$ Pa to $1.2\times10^6$ Pa. Therefore, the intermediate transfer recording medium exhibits excellent peelability when the peelable transparent sheet provided with the dye receptive layer is transferred to a transfer-receiving member.

In either of the film transfer sheet and intermediate transfer recording medium of the present invention, the layer preferably comprises as an essential component cellulose acetate propionate having a number average molecular weight of 10,000 to 30,000 and/or cellulose acetate butyrate having a number average molecular weight of 10,000 to 30,000, from the viewpoint of preventing heat fusing of the layer and transfer-receiving member upon transfer.

In the film transfer sheet of the present invention, the peelable transparent sheet provided with the adhesive layer may be provided with a hologram layer. In the intermediate transfer recording medium of the present invention, the peelable transparent sheet provided with the dye receptive layer may be provided with a hologram layer. Printed products protected by them are allowed to be highly forgery-proof.

Figure 1A:
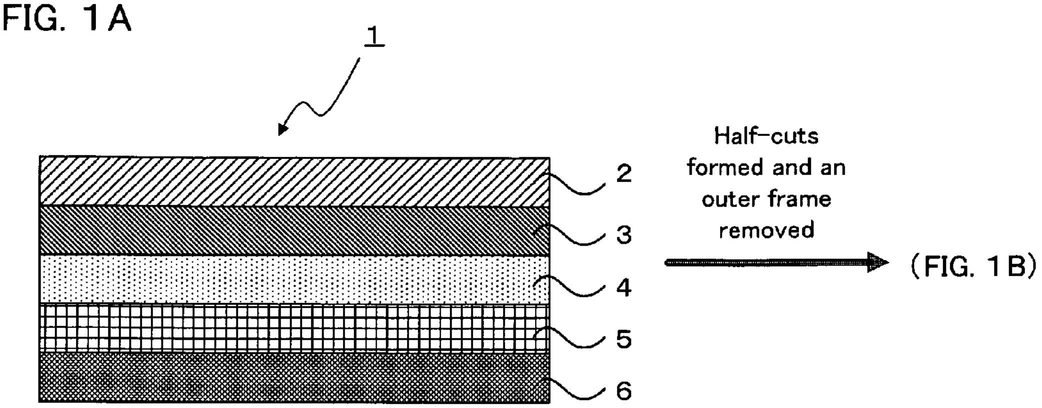
FIGS. 1A to 1C are a schematic sectional view of an embodiment of a film transfer sheet of the present invention and a schematic explanatory view showing the method for using the film transfer sheet.

The reference numerals in the figures denote the following elements:

Reference numeral 1 denotes a film transfer sheet; reference numerals 2 and 11 denote a sheet substrate; reference numerals 3 and 12 denote a resin layer; reference numerals 4 and 13 denote a layer; reference numerals 5 and 14 denote a peelable transparent sheet; reference numeral 6 denotes an adhesive layer; reference numerals 7 and 17 denote a half cut; reference numerals 8 and 18 denote a hologram layer; reference numerals 9 and 19 denote a reflection layer; reference numeral 10 denotes an intermediate transfer recording medium; reference numeral 15 denotes a primer layer; and reference numeral 16 denotes a dye receptive layer.

DESCRIPTION OF THE PREFERRED EMBODIMENT

I. Film Transfer Sheet

The film transfer sheet of the present invention comprises a sheet substrate provided with a layer via a resin layer and a peelable transparent sheet provided with an adhesive layer, in which the sheet substrate and the peelable transparent sheet are laminated together such that the layer is overlapped on the peelable transparent sheet and peeling is designed to occur between the layer and the peelable transparent sheet so as to transfer the peelable transparent sheet provided with the adhesive layer to a transfer-receiving member, wherein the resin layer comprises as an essential component a pressure-sensitive adhesive having a storage elastic modulus of $3.0\times10^5$ Pa to $1.2\times10^6$ Pa at a temperature of 130° C. to 150° C.

The use of the film transfer sheet of the present invention results in a structure in which the peelable transparent sheet protects a thermally transferred image formed on a transfer-receiving member via the adhesive layer. According to the present invention, unlike conventional protective layers comprising a thin film prepared by coating, the peelable transparent sheet comprising a plastic film functions as a strong protective layer along with the adhesive layer, thereby providing distinctly excellent durability to the image. Further, as dynamic viscoelasticity of the resin layer constituting the film transfer sheet, a storage elastic modulus at a temperature of 130° C. to 150° C. is specified in the specific range of $3.0\times10^5$ Pa to $1.2\times10^6$ Pa. Therefore, the film transfer sheet exhibits excellent peelability when transferring the peelable transparent sheet provided with the adhesive layer to a transfer-receiving member.

Figure 1B:
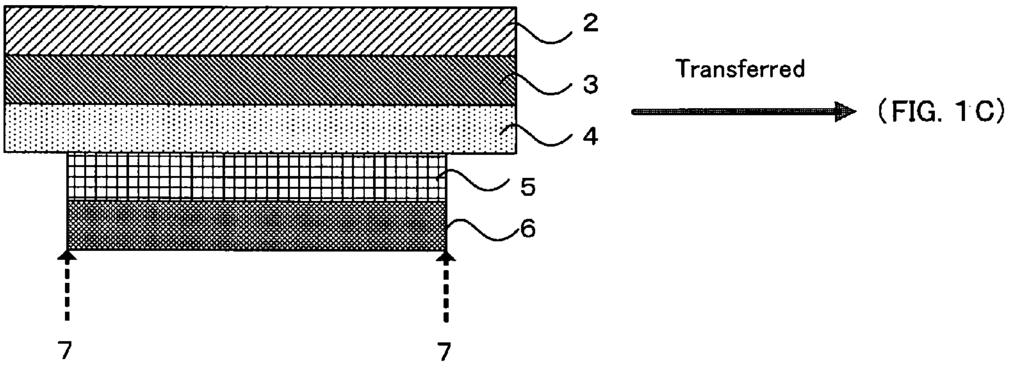
Figure 1C:
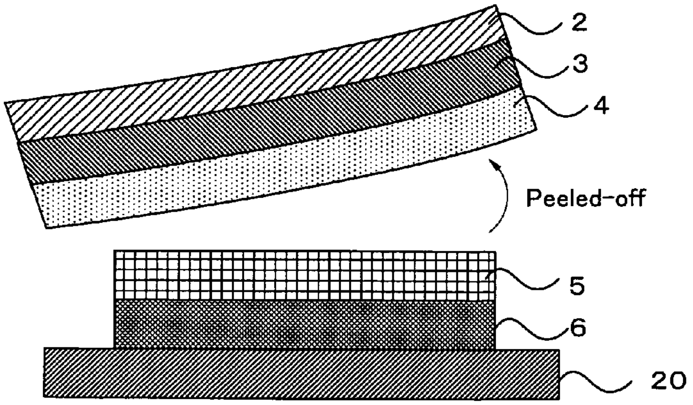

FIG. 1A shows a schematic sectional view of an embodiment of the film transfer sheet 1 of the present invention. FIGS. 1A to 1C schematically show the method for using the film transfer sheet. As shown in FIG. 1A, one embodiment of the film transfer sheet 1 of the present invention has a structure in which a resin layer 3, a layer 4, a peelable transparent sheet 5 and an adhesive layer 6 are laminated in this order on one surface of a sheet substrate 2. Next, as shown in FIG. 1 B, depending on the size of a thermal transfer image to be covered, half-cut processing is performed on the peelable transparent sheet 5 provided with the adhesive layer 6 to peel off and remove an unnecessary outer frame portion. In some cases, a detection mark (not shown) for controlling a transfer position in a thermal transfer printer may be printed on the film transfer sheet.

Next, as shown in FIG. 1C, the film transfer sheet 1 is overlapped on a transfer-receiving member 20 having an image preliminarily formed thereon so as to bring the image into contact with the adhesive layer 6, followed by heating and pressing. Then, the layer 4 is peeled from the peelable transparent sheet 5, thus transferring the peelable transparent sheet 5 provided with the adhesive layer 6 to the transfer-receiving member 20.

Hereinafter, each of the layers of the film transfer sheet of the present invention will be respectively described in detail.

(Sheet Substrate)

Examples of materials as the sheet substrate 2 of the film transfer sheet used in the present invention include, though not particularly limited to, condenser paper, glassine paper, parchment paper, or high sizing paper, synthetic paper (polyolefin types and polystyrene types), wood free paper, art paper, coated paper, cast-coated paper, wall paper, backing paper, synthetic resin- or emulsion-impregnated paper, synthetic rubber latex-impregnated paper, synthetic resin-addition paper, paperboard, cellulose fiber paper, or films of polyester, polyacrylate, polycarbonate, polyurethane, polyimide, polyetherimide, cellulose derivatives, polyethylene, ethylene/vinyl acetate copolymer, polypropylene, polystyrene, acryl, polyvinyl chloride, polyvinylidene chloride, polyvinyl alcohol, polyvinylbutyral, nylon, polyether ether ketone, polysulfone, polyether sulfone, tetrafluoroethylene/perfluoroalkylvinyl ether, polyvinyl fluoride, tetrafluoroethylene/ethylene, tetrafluoroethylene/hexafluoropropylene, polychlorotrifluoroethylene, polyvinylidene fluoride and the like.

As the sheet substrate, those having a thickness of 10 μm to 100 μm are preferable. When the sheet substrate is too thin, the hardness of a film transfer sheet thus obtained becomes insufficient with the result that the film transfer sheet cannot be carried by a thermal transfer printer and curls or wrinkles may be produced on the film transfer sheet. On the other hand, when the sheet substrate is too thick, the resulting film transfer sheet becomes too thick and hence the power required of a thermal transfer printer to carry and drive the sheet becomes too large, which may cause the failures of the printer and render it impossible to normally carry the film transfer sheet.

(Resin Layer)

The resin layer 3 to be provided on the aforementioned sheet substrate comprises as an essential component a pressure-sensitive adhesive having a storage elastic modulus of $3.0\times10^5$ Pa to $1.2\times10^6$ Pa at a temperature of 130° C. to 150° C. Examples of the pressure-sensitive adhesive include polyurethane resin, polyester resin, acrylic resin, vinyl resin, epoxy resin, a copolymer thereof and a mixture thereof, all of which containing a self cross-linking functional group or a functional group reactive with a cross-linking agent component. In the present invention, an essential peelability function is assumed by the layer which will be described in detail below. The resin layer functions to bond the layer to the above sheet substrate, and it comprises as an essential component the above-specified pressure-sensitive adhesive. Upon heat transfer, the resin layer is subject to heat stress from the seat substrate side. Thus, depending on a resin used for the resin layer, the adhesive function to bond the layer to the sheet substrate may be lost. The adhesive function, however, can be excellent by using, as an essential component, a specific pressure-sensitive adhesive having a storage elastic modulus in the above range (parameter) specified in the present invention.

In the case of adding a cross-linking agent in the above-specified pressure-sensitive adhesive, the mixing ratio of a main agent of the pressure-sensitive adhesive to the cross-linking agent is 100:0.5 to 100:20, preferably 100:2 to 100:10, on mass basis. If it is less than the above-mentioned range, the pressure-sensitive adhesive becomes too soft, and thus cohesive failure is likely to occur in a film of the adhesive. If it exceeds the above-mentioned range, the pressure-sensitive adhesive becomes too hard and has poor adhesion. Thus, the pressure-sensitive adhesive may fail to function as an adhesive. Examples of the cross-linking agent include isocyanate compounds, epoxy compounds, oxazoline compounds, carbodiimide compounds and silanol group-containing compounds. Among them, isocyanate compounds are preferably used. In the case of a highly reactive pressure-sensitive adhesive, one capable of self cross-linking by heat, ultraviolet ray, electron beam or the like may be used, without adding a cross-linking agent. In a cross-linking reaction of the pressure-sensitive adhesive, a catalyst may be added to promote the cross-linking reaction. As the catalyst, any catalyst may be used without any particular limitation as far as it functions as the catalyst of the cross-linking reaction of the pressure-sensitive adhesive, and there may be used existing catalysts such as amine catalysts and tin catalysts.

A storage elastic modulus of the pressure-sensitive adhesive contained in the resin layer as an essential component was measured by the method that will be described below. In the case of a pressure-sensitive adhesive mixed with a cross-linking agent component, a storage elastic modulus thereof is measured under the condition that a main agent is mixed with a cross-linking agent. In the case of a self cross-linking type pressure-sensitive adhesive alone, a storage elastic modulus thereof is measured for a sample of the adhesive after subjected to cross-linking. The storage elastic modulus denotes dynamic viscoelasticity, and the dynamic viscoelasticity is generally represented as follows:

$$E^*=E'+iE''\,[\mathrm{Pa}]$$

$$E'=E^*\cos$$

$$E''=E^*\sin$$

In the formulae, E* denotes a complex elastic modulus. E' denotes a storage elastic modulus and reflects an elastic property of a sample, and it is a scale for energy that is required for a stress applied per one cycle to be stored and recovered completely. E" denotes a loss elastic modulus and reflects a viscous property of a sample, and it is a scale for energy to be consumed as heat per one cycle.

In the present invention, the storage elastic modulus of the pressure-sensitive adhesive is represented by a value of a storage elastic modulus at a temperature of 130° C. to 150° C. in a viscoelastic property obtained through processes in which: after a resin layer comprising only an intended cross-linked pressure-sensitive adhesive (a main agent is essential for the adhesive; in the case that the main agent is mixed with a cross-linking agent or catalyst, the adhesive is in the condition that it comprises only the components and no other components are contained therein) has been prepared, a sample is taken from the resin layer, and the sample is measured by means of a dynamic viscoelasticity measuring apparatus (product name: ARES; manufactured by: TA Instruments Japan) in the range of 100 to 160° C. It is to be noted that all values of the storage elastic modulus in the present invention are those measured by the ARES; however, any measuring apparatus or method capable of measurement under the same principle or condition may be used to measure the storage elastic modulus, and values obtained by such a measuring apparatus or method may be used as well as those measured by the ARES. It is not required to measure the storage elastic modulus only by the ARES, and values of the storage elastic modulus are not limited to those measured by the ARES.

If the pressure-sensitive adhesive of the resin layer has a storage elastic modulus of less than $3.0\times10^5$ Pa at a temperature of 130° C. to 150° C., there are problems such as cohesive failure in the resin layer and peeling off of the resin layer from the sheet substrate, both of which arise when the film-transfer sheet is used to transfer the peelable transparent sheet provided with the adhesive layer to a transfer-receiving layer. That is, the adhesive function to bond the peelable layer to the sheet substrate is lost, thereby failing to achieve stable transfer. If the storage elastic modulus is more than $1.2\times10^6$ Pa at a temperature of 130° C. to 150° C., there are also problems such that the layer is left on the peelable transparent sheet side. That is, the adhesive function to bond the layer to the sheet substrate is lost, thereby failing to achieve stable transfer.

Although the resin layer to be provided on the sheet substrate mainly consists of the aforementioned pressure-sensitive adhesive, a filler or various additives, such as an antioxidant may be added to the resin layer as needed for improvement in strength of the resin layer, prevention of blocking, etc. The resin layer may be formed in such a manner that each of the components appropriately mixed with various additives is dissolved or dispersed in the above pressure-sensitive adhesive to prepare an application solution, followed by applying the solution on the sheet substrate and drying the same. As the application method, well-known forming means such as gravure coating, gravure reverse coating and roll coating may be used. An applied amount of the resin layer is about 0.5 to 10 g/m$^2$ (on a solid basis) and preferably 3.0 to 6.0 g/m$^2$ (on a solid basis)

(Peelable Layer)

(Layer)

The layer 4 comprises a binder resin. As the binder resin, various known thermoplastic and thermosetting resins used in the art may be used.

Examples of the thermoplastic resins include acrylic resins such as polymethacrylate, polymethacrylamide, polymethyl methacrylate, polyethyl methacrylate and polybutyl acrylate; vinyl resins such as polyvinyl acetate, vinyl chloride-vinyl acetate copolymer, polyvinyl alcohol and polyvinyl butyral; and cellulose derivatives such as ethylcellulose, nitrocellulose and cellulose acetate.

Examples of the thermosetting resins include unsaturated polyester resin, polyester resin, polyurethane-based resin and aminoalkyd resin. These binder resins may be used solely or in combination of two or more kinds.

Preferably, the layer of the present invention comprises, as an essential component, especially cellulose acetate propionate having a number average molecular weight of 10,000 to 30,000 or cellulose acetate butyrate having a number average molecular weight of 10,000 to 30,000. Cellulose acetate propionate is a mixed ester comprising .alpha.-cellulose reacted with propionic acid, acetic acid and anhydrides thereof, and it is sometimes referred to as the abbreviation “CAP”. Cellulose acetate butyrate is a mixed ester comprising a-cellulose reacted with acetic acid, butyric acid and anhydrides thereof, and it is sometimes referred to as the abbreviation “CAB”.

If cellulose acetate propionate or cellulose acetate butyrate having a number average molecular weight of 10,000 to 30,000 is used as an essential component of the layer, excellent peelability is exhibited between the layer and the peelable transparent sheet when the peelable transparent sheet provided with the adhesive layer is transferred to a transfer-receiving member. After half-cut processing is performed on the peelable transparent sheet provided with the adhesive layer to peel off and remove an unnecessary outer frame portion, the layer is exposed at the portion where the unnecessary outer frame portion was removed. However, at the time of overlapping the film transfer sheet on a transfer-receiving member to transfer the peelable transparent sheet provided with the adhesive layer to the transfer-receiving member, no heat fusing of the transfer-receiving member with the exposed surface of the layer occurs and the transfer is completed successfully.

Preferably, the cellulose acetate propionate or cellulose acetate butyrate has a number average molecular weight of 10,000 to 30,000. If the number average molecular weight is less than 10,000, stable transfer may not be performed since cohesive failure may occur in the resin layer, the layer may be left on the peelable transparent sheet, or the like. If the number average molecular weight is more than 30,000, sticking may occur when the peelable transparent sheet with the adhesive layer is transferred to a transfer-receiving member, and peel-off performance may become unstable.

In addition to the binder resin, the layer may comprise wax. Wax imparts improved abrasion resistance and layer-cuttability to the layer. Examples of the wax include polyethylene wax, polyester wax, polystyrene-based powder, olefin-based powder, microcrystalline wax, carnauba wax, paraffin wax, Fischer-Tropsh wax, various types of low-molecular weight polyethylene, Japan wax, beeswax, spermaceti, wool wax, shellac wax, candelilla wax, petrolactum, partially modified wax, fatty acid esters and fatty acid amides. It is preferable that the layer contains wax of normally about 0.1 to 30 wt. %, preferably about 0.1 to 10 wt. %.

A preparation method of the layer may be the same method as that of the resin layer. An applied amount of the layer is about 0.5 to 5 g/m$^2$ (on a solid basis) and preferably 1.0 to 2.5 g/m$^2$ (on a solid basis).

(Peelable transparent Sheet)

The peelable transparent sheet 5 used in the film transfer sheet of the present invention functions as a protective layer in such a way that a portion of the peelable transparent sheet (the peelable transparent sheet provided with the adhesive layer) is cut at the half-cut portion as the boundary and an image-formed portion of the transfer-receiving member, which image was thermally transferred to the transfer-receiving member, is covered with the peelable transparent sheet. As the peelable transparent sheet 5, any material may be used without any particular limitation as far as it has transparency and durability regarding, for example, weather resistance, friction resistance and chemical resistance. Given as examples of materials used for the peelable transparent sheet are a polyethylene terephthalate film, 1,4-polycyclohexylenedimethylene terephthalate film, polyethylene naphthalate film, polyphenylene sulfide film, polystyrene film, polypropylene film, polysulfone film, alamide film, polycarbonate film, polyvinyl alcohol film, cellophane, cellulose derivatives such as cellulose acetate, polyethylene film, polyvinyl chloride film, nylon film, polyimide film and ionomer film, all of which having a thickness of about 0.5 to 100 μm and preferably about 10 to 40 μm.

The adhesive layer 6 is for bonding securely the peelable transparent sheet with the transfer-receiving member. As the adhesive layer, various known adhesives may be used including acrylic resin, urethane resin, amide resin, epoxy resin, rubber-based resin, ionomer resin and so on. A preparation method of the adhesive layer may be the same method as that of the resin layer. An applied amount of the adhesive layer is about 0.5 to 10 g/$m^2$ (on a solid basis) and preferably 2.0 to 3.0 g/$m^2$ (on a solid basis).

In the film transfer sheet of the present invention, the peelable transparent sheet provided with the adhesive layer may be provided with a hologram layer. In this case, printed products protected by such a peelable transparent sheet are allowed to be highly forgery-proof.

Figure 2:
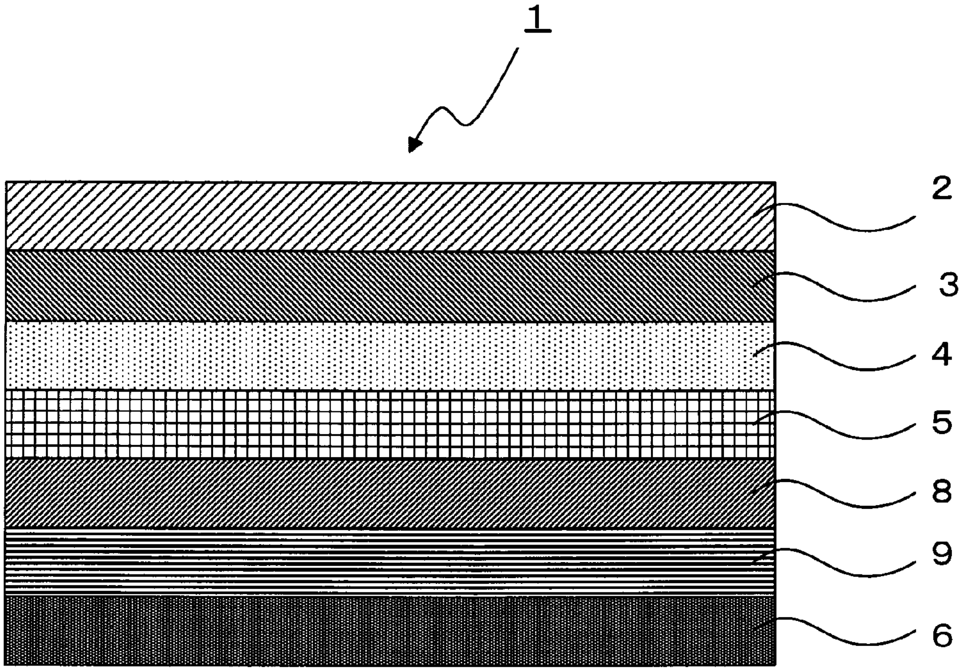
FIG. 2 is a schematic sectional view of an embodiment of the film transfer sheet of the present invention, which film transfer sheet being provided with a hologram layer.

FIG. 2 shows a schematic sectional view of an embodiment of the film transfer sheet 1 of the present invention, which sheet being provided with a hologram layer. The film transfer sheet 1 of the present invention has a structure in which the resin layer 3, the layer 4, the peelable transparent sheet 5, a hologram layer 8, a reflection layer 9 and the adhesive layer 6 are laminated in this order on one surface of the sheet substrate 2.

The hologram layer 8 is a layer having a hologram microasperity formed on one surface of a synthesized resin layer, and it is also a relief forming layer. The hologram is a typical example of an optical diffraction structure, and includes a plane hologram and a volume hologram, both of which are usable. Specific examples include: a relief hologram, a Lippmann hologram, a Fresnel hologram, a Fraunhofer hologram, a lensless Fourier-transform hologram, a laser reconstructed hologram (e.g. image hologram), a white light reconstructed hologram (e.g. rainbow hologram), a color hologram, a computer hologram, a hologram display, a multiplex hologram, a holographic stereogram, a holographic diffraction grating, and so on.

The synthesized resin for the hologram layer may be a thermosetting resin such as unsaturated polyester, melamine, epoxy, polyester(meth)acrylate, urethane(meth)acrylate, epoxy(meth)acrylate, polyether(meth)acrylate, polyol(meth) acrylate, melamine(meth)acrylate and triazine-based acrylate, in addition to a thermoplastic resin such as polyvinyl chloride, acrylic resin (e.g. PMMA),polystyrene and polycarbonate. The above-listed thermosetting or thermoplastic resins may be used solely. Alternatively, the thermosetting resin and the thermoplastic resin may be used as a mixture. Furthermore, a thermoforming material having a radical polymerizable unsaturated group, oranionizing radiation curable material obtained by adding a radical polymerizable unsaturated monomer to the above listed material may be used, for example. Other photosensitive materials such as silver salt, gelatin dichromate, thermoplastic, diazo-based photosensitive material, photoresist, ferroelectrics, photochromics, thermochromics, chalcogen glass and so on may be also used.

The hologram can be formed onto the layer made of the above listed resin or resins by a known method. For example, in the case that interference fringes of the hologram or the diffraction grating are recorded as a relief of the surface asperity, an original plate on which the interference fringes or the diffraction grating are recorded as the relief of the surface asperity is used as a press die, and the original plate is placed on the above-mentioned resin layer. Then, the original plate and the resin layer are thermo compressed by means of an appropriate device such as a heating roller, so that the surface asperity of the original plate is reproduced. In the case of using a photopolymer, the photopolymer is coated on the peelable transparent sheet, and then the original plate is placed thereon. Then, the peelable transparent sheet coated with the photopolymer is irradiated with laser beam via the original plate, so that the surface asperity of the original plate is reproduced. A thickness of such a hologram layer is preferably 0.1 to 6 μm, more preferably 0.1 to 4 μm.

(Reflection Layer)

By providing a reflection layer on a surface of the hologram layer, which surface is a relief surface having a predetermined relief structure formed thereon, a reflection effect and/or diffraction effect of the relief is increased. Therefore, there is no particular limitation to the reflection layer 9 as far as it has higher reflectance than that of the hologram layer. The reflection layer has a nearly transparent, colorless hue and an optical reflective index different from that of the hologram layer. Consequently, although the reflection layer has nometallic luster, brightness of the hologram or the like can be visible, thereby forming a transparent hologram. As the reflection layer, thin layers having a higher optical reflective index than that of the hologram layer and thin layers having a lower optical reflective index may be used. Examples of the former thin layers include ZnS, $TiO^2$, $Al^2O^3$, $Sb^2S^3$, SiO, $SnO^2$ and ITO. Examples of the latter include LiF, $MgF^2$ and $AlF^3$. Metal oxides or nitrides are preferred as the material of reflection layer. More specifically, there may be listed oxides or nitrides of Be, Mg, Ca, Cr, Mn, Cu, Ag, Al, Sn, In, Te, Fe, Co, Zn, Ge, Pb, Cd, Bi, Se, Ga, Rb, Sb, Pb, Ni, Sr, Ba, La, Ce and Au, or a mixture of two or more of those. Common and optically reflective thin layers of metal (e.g. aluminum) having a thickness of 200 Å may be used as the reflection layer since such metallic layers are imparted with transparency.

As in the case of metallic thin layers, the reflection layer may be formed on the relief surface of the hologram layer by, for example, the vacuum thin layer method such as deposition, sputtering, ion plating and CVD, so as to have a thickness of about 10 to 2,000 nm, preferably of 20 to 1,000 nm. Further, transparent synthetic resins having a different optical reflective index from that of the hologram layer may be used.

In addition, the film transfer sheet of the present invention may contain structures other than the above as far as the intended benefits of the present invention are not impaired.

II. Intermediate Transfer Recording Medium

The intermediate transfer recording medium of the present invention comprises a sheet substrate provided with a layer via a resin layer and a peelable transparent sheet provided with a dye receptive layer, in which the sheet substrate and the peelable transparent sheet are laminated together such that the layer is overlapped on the peelable transparent sheet and peeling is designed to occur between the layer and the peelable transparent sheet so as to transfer the peelable transparent sheet provided with the dye receptive layer to a transfer-receiving member, wherein the resin layer comprises as an essential component a pressure-sensitive adhesive having a storage elastic modulus of $3.0\times10^5$ Pa to $1.2\times10^6$ Pa at a temperature of 130° C. to 150° C.

The use of the intermediate transfer recording medium of the present invention results in a structure in which the dye receptive layer having a thermally transferred image formed thereon and the peelable transparent sheet are laminated on a transfer-receiving member. According to the present invention, the peelable transparent sheet comprising a plastic film protects the thermally transferred image formed on the transfer-receiving member. Therefore, unlike conventional protective layers comprising a thin film prepared by coating, distinctly excellent durability is provided to the image. Further, as dynamic viscoelasticity of the resin layer of the intermediate transfer recording medium, a storage elastic modulus at a temperature of 130° C. to 150° C. is specified in the specific range of $3.0\times10^5$ Pa to $1.2\times10^6$ Pa. Therefore, the intermediate transfer recording medium exhibits excellent peelability when the peelable transparent sheet provided with the dye receptive layer is transferred to a transfer-receiving member.

Figure 3A:
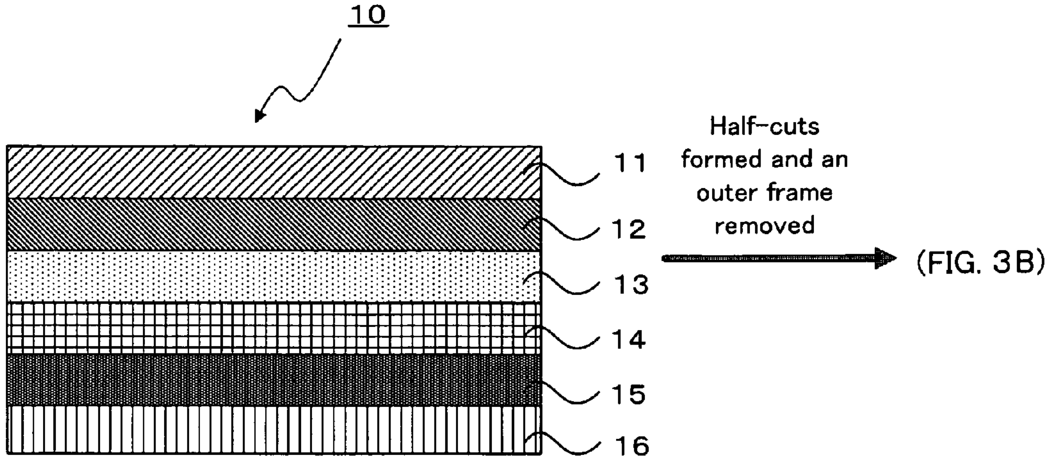
FIGS. 3A to 3C are a schematic sectional view of an embodiment of an intermediate transfer recording medium of the present invention and a schematic explanatory view showing the method for using the intermediate transfer recording medium.
Figure 3B:
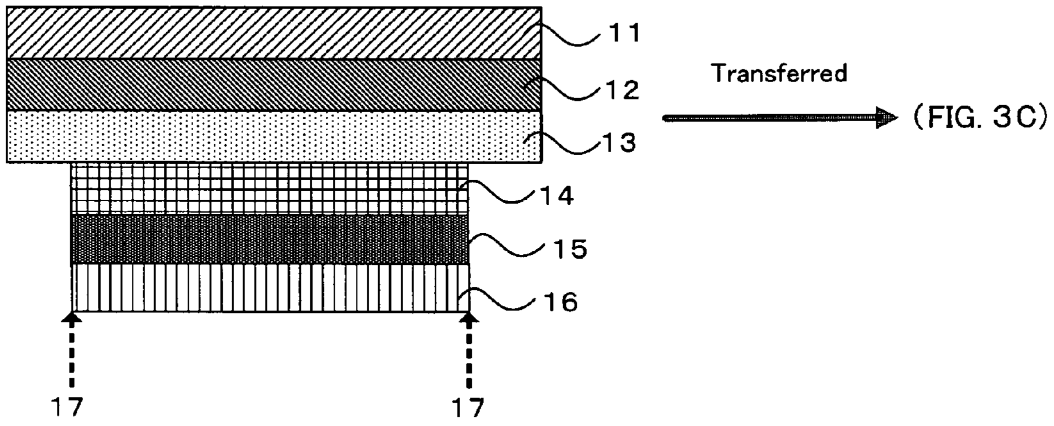
Figure 3C:
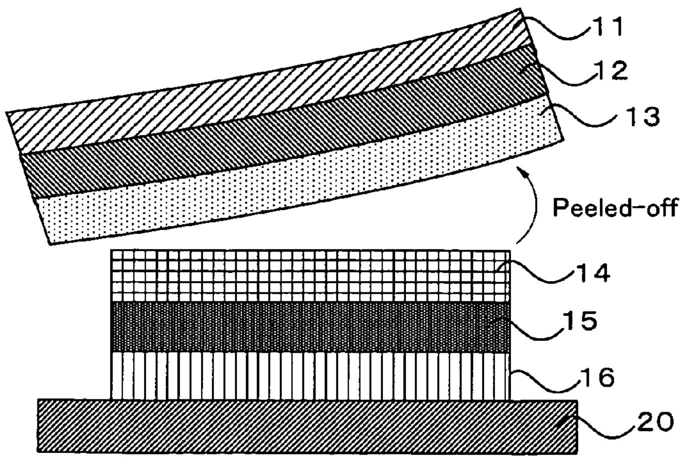

FIG. 3A shows a schematic sectional view of an embodiment of an intermediate transfer recording medium 10 of the present invention. FIGS. 3A to 3C schematically show the method for using the intermediate transfer recording medium. As shown in FIG. 3A, one embodiment of the intermediate transfer recording medium 10 of the present invention has a structure in which a resin layer 12, a layer 13, a peelable transparent sheet 14, a primer layer 15 and a dye receptive layer 16 are laminated in this order on one surface of a sheet substrate 11. Next, as shown in FIG. 3B, depending on the size of a thermal transfer image to be covered, half-cut processing 17 is performed on the peelable transparent sheet 14 provided with the dye receptive layer 16 (FIG. 3B shows that the peelable transparent sheet 14 is also provided with the primer layer 15) to peel off and remove an unnecessary outer frame portion.

Next, as shown in FIG. 3C, an image is formed on the dye receptive layer 16 of the intermediate transfer recording medium 10 with a sublimation transfer-type thermal transfer sheet, and the intermediate transfer receiving medium 10 is overlapped on the transfer-receiving member 20 so as to bring the transfer-receiving member 20 into contact with the dye receptive layer 16 having a thermal transfer image formed thereon, followed by heating and pressing. Then, when peeling-off the intermediate transfer recording medium, peeling occurs between the layer 13 and the peelable transparent sheet 14 to transfer the peelable transparent sheet 14 provided with the primer layer 15 and the dye receptive layer 16 to the transfer-receiving member 20. In FIGS. 3A to 3C, the primer layer is shown between the peelable transparent sheet and the dye receptive layer. However, the intermediate transfer recording medium of the present invention can be prepared without the primer layer. In this case, peeling occurs between the layer 13 and the peelable transparent sheet 14 to transfer the peelable transparent sheet 14 provided with the dye receptive layer 16 to the transfer-receiving member 20.

Figure 4:
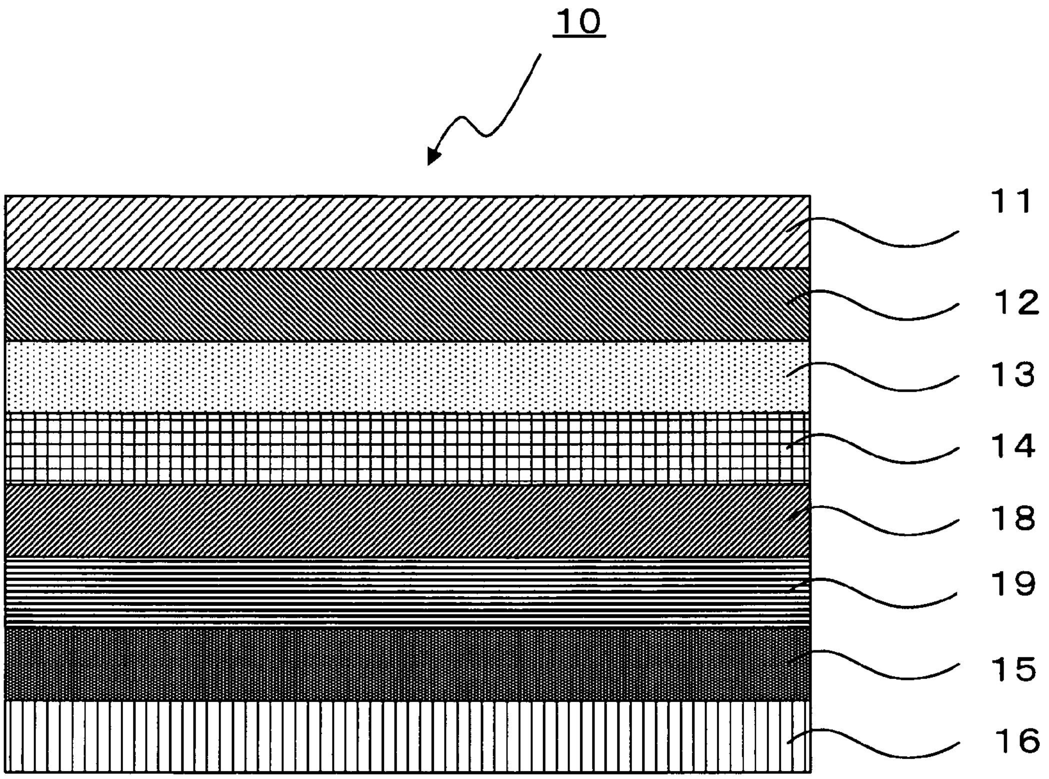
FIG. 4 is a schematic sectional view of an embodiment of the intermediate transfer recording medium of the present invention, which intermediate transfer recording medium being provided with a hologram layer.

In the intermediate transfer recording medium of the present invention, the peelable transparent sheet provided with the dye receptive layer may be provided with a hologram layer. In this case, printed products protected with such a peelable transparent sheet are allowed to have a high forgery proof performance. FIG. 4 shows a schematic sectional view of an embodiment of the intermediate transfer recording medium 10 of the present invention, which medium being provided with a hologram layer. The intermediate transfer recording medium 10 of the present invention has a structure in which the resin layer 12, the layer 13, the peelable transparent sheet 14, a hologram layer 18, a reflection layer 19, the primer layer 15 and the dye receptive layer 16 are laminated in this order on one surface of the sheet substrate 11.

Hereinafter, each of the layers of the intermediate transfer recording medium of the present invention will be described in detail. It is to be noted that the sheet substrate 11, the resin layer 12, the layer 13, the peelable transparent sheet 14, the hologram layer 18 and the reflection layer 19 are as described in the description of the sheet substrate 2, the resin layer 3, the layer 4, the peelable transparent sheet 5, the hologram layer 8 and the reflection layer 9, respectively.

The primer layer 15 may be disposed between the dye receptive layer and peelable transparent sheet of the intermediate transfer recording medium of the present invention as needed, for the purpose of, for example, imparting adhesion therebetween. Since the primer layer functions to keep the peelable transparent sheet and the dye receptive layer, it is preferable that the primer layer have a certain degree of mechanical strength which will cause no trouble in handling even when in heating of a portion of the peelable transparent sheet (the peelable transparent sheet provided with the dye receptive layer) in the process of thermal transfer.

Examples of materials forming the primer layer include synthetic resins such as polyester, polyacrylate, polycarbonate, polyurethane, polyimide, polyetherimide, cellulose derivatives, polyethylene, ethylene/vinyl acetate copolymer, polypropylene, polystyrene, acryl polymer, polyvinyl chloride, polyvinylidene chloride, polyvinyl alcohol, polyvinylbutyral, nylon, polyether ether ketone, polysulfone, polyether sulfone, tetrafluoroethylene/perfluoro (alkylvinyl ether) copolymer, polyvinyl fluoride, tetrafluoroethylene/ethylene copolymer, tetrafluoroethylene/hexafluoropropylene copolymer, polychlorotrifluoroethylene, and polyvinylidene fluoride. A white pigment, filler, conductive material or the like may be as far as no transparency is deteriorated.

A preparation method of the primer layer may be the same method as that of the resin layer. An applied amount of the primer layer is about 0.2 to 2.0 g/$m^2$ (on a solid basis), and preferably 0.5 to 0.7 g/$m^2$ (on a solid basis).

(Dye Receptive Layer)

The dye receptive layer 16 to be formed on the peelable transparent sheet may be formed on the peelable transparent sheet directly or via the primer layer. The dye receptive layer works to receive colorants transferred from the thermal transfer sheet by heating. In the case of using, particularly, a sublimation dye, it is desired that the receptive layer receive the dye to develop a color and prevent the dye once received from resublimating. Using the intermediate transfer recording medium, a transfer image is formed on the dye receptive layer and only the image-formed portion is retransferred to the transfer-receiving member to form an image. It is general to allow the dye receptive layer to have transparency so that the image transferred to the transfer-receiving member can be clearly observed from above. It is however possible to intentionally make the dye receptive layer dull or slightly colored to thereby characterize the retransferred image.

In general, the dye receptive layer is primarily constituted of a thermoplastic resin. Examples of materials forming the dye receptive layer include polyolefin type resins such as polypropylene, polymer halides such as vinyl chloride/vinyl acetate copolymer and polyvinylidene chloride, polyester type resins such as polyacrylate, polyvinyl acetate and ethylene/vinyl acetate copolymer, polystyrene type resins, polyamide type resins, copolymer type resins of olefins such as ethylene and propylene and other vinyl polymers, ionomers, cellulose type resins such as cellulose diacetate, and polycarbonate type resins. Among these compounds, polyester type resins, vinyl chloride/vinyl acetate copolymer and mixtures of these compounds are particularly preferable.

A releasing agent may be mixed with the dye receptive layer in sublimation transfer recording in order, when forming an image, to prevent the fusion of the thermal transfer sheet having a color transfer layer with the dye receptive layer of the intermediate transfer recording medium or to prevent a reduction in the sensitivity of a printed image. Examples of the releasing agent preferably mixed in use include silicone oil, phosphate type surfactants and fluorine type surfactants. Among these compounds, silicone oil is preferred. Preferable examples of silicone oil include modified silicone oils include epoxy-modified, vinyl-modified, alkyl-modified, amino-modified, carboxyl-modified, alcohol-modified, fluorine-modified, alkylaralkyl polyether-modified, epoxy/polyether-modified and polyether-modified silicone oils.

One or two or more types of releasing agents may be used. An amount of the releasing agent to be added is preferably 0.5 to 10 parts by weight based on 100 parts by weight of the resin for forming the dye receptive layer. When the amount does not fall within this range, there may be problems such as the fusion of the sublimation thermal transfer sheet with the dye receptive layer of the intermediate transfer recording medium or a reduction in the transfer sensitivity to a transfer-receiving member. By addition of such a releasing agent to the dye receptive layer, the releasing agent is bled out on the surface of the dye receptive layer after being transferred, thereby forming a releasing layer. These releasing agents may not be added to the dye receptive layer but applied to the dye receptive layer separately. The dye receptive layer may be formed in such a manner that the above-mentioned resin mixed with a necessary additive such as a releasing agent is dissolved or dispersed in an appropriate organic solvent to prepare an application solution, followed by applying the application solution to the peelable transparent sheet and drying the same. As the application method, well-known forming means as described in the description of "Resin Layer" may be used. In the formation of the dye receptive layer, the thickness of the dye receptive layer, though it is optional, is usually 1 to 50 g/m$^2$ measured in dry condition. Although such a dye receptive layer is preferably a continuous coating, it may be formed as a discontinuous coating by using a resin emulsion, an aqueous resin or a resin dispersion. Moreover, an antistatic agent may be applied onto the dye receptive layer to improve stability in the carriage of a thermal transfer printer.

Further, the intermediate transfer recording medium of the present invention may contain structures other than the above as far as the intended benefits of the present invention are not impaired.

The present invention is not limited to the above-mentioned embodiments. The above-mentioned embodiments are examples, and any that has the substantially same essential features as the technical ideas described in the claims of the present invention and exerts the same effects and advantages is included in the technical scope of the invention.

EXAMPLES

Next, the present invention will be explained in more detail by way of examples, in which all designations of parts and % are expressed on weight basis, unless otherwise noted.

Example 1

On a peelable transparent sheet of a 25 μm-thick polyethylene terephthalate film (product name: LUMILAR; manufactured by: Toray Industries, Inc.), an adhesive layer having the composition described below was formed in a thickness of 2.5 g/m measured in dry condition. On the opposite surface to that having the adhesive layer formed thereon, a layer having the composition described below was formed in a thickness of 1.5 g/m$^2$ measured in dry condition. Moreover, on the layer, a resin layer having the composition described below was formed in a thickness of 4.0 g/m$^2$ measured in dry condition. The surface of the resin layer was put together with a 38 pm-thick polyethylene terephthalate film (product name: LUMILAR; manufactured by: Toray Industries, Inc.) to form a laminate by dry lamination. Moreover, as shown in FIGS. 1A and 1 B, half-cut (7) treatment was performed on a film transfer sheet (the resulting laminate), specifically, on a portion of the peelable transparent sheet including the adhesive layer 6 using a press system consisting of an upper die with a cutter blade attached thereto and a pedestal to prepare a film transfer sheet of Example 1. All of the above adhesive layer, resin layer and layer were applied by gravure coating. In the film transfer sheet, peeling is designed to occur between the layer and the peelable transparent sheet.

(Composition of an Application Solution for Adhesive Layer)

Vinyl chloride/vinyl acetate copolymer: 20 parts
Acrylic resin: 10 parts
Ethyl acetate: 20 parts
Toluene: 50 parts (Composition of an Application Solution for Resin Layer)

Polyester-based pressure-sensitive adhesive (a mixture of SEIKABOND E295 and Isocyanate cross-linking agent C55, either manufactured by Dainichiseika Color & Chemicals Mfg. Co. Ltd., at a mix ratio of 9/0.25): 20 parts
Ethyl acetate: 80 parts (Composition of an Application Solution for Layer)

Acrylic resin: 50 parts
Polyethylene wax: 2.5 parts
Methyl ethyl ketone/Toluene (amass ratio of 1/1): 50 parts

Example 2

The same procedures as in Example 1 were carried out, except that the composition of the application solution for the resin layer of Example 1 was changed to that described below, to prepare a film transfer sheet of Example 2.

(Composition of an Application Solution for Resin Layer)

Polyester-based pressure-sensitive adhesive (a mixture of SEIKABOND E295 and Isocyanate cross-linking agent C55, either manufactured by Dainichiseika Color & Chemicals Mfg. Co. Ltd., at a mix ratio of 9/0.5): 20 parts
Ethyl acetate: 80 parts

Example 3

The same procedures as in Example 1 were carried out, except that the composition of the application solution for the resin layer of Example 1 was changed to that described below, to prepare a film transfer sheet of Example 3.

(Composition of an Application Solution for Resin Layer)

Polyester-based pressure-sensitive adhesive (a mixture of SEIKABOND E295 and Isocyanate cross-linking agent C55, either manufactured by Dainichiseika Color & Chemicals Mfg. Co. Ltd., at a mix ratio of 9/1): 20 parts
Ethyl acetate: 80 parts

Example 4

The same procedures as in Example 1 were carried out, except that the composition of the application solution for the resin layer of Example 1 was changed to that described below, to prepare a film transfer sheet of Example 4.

(Composition of an Application Solution for Resin Layer)

Polyester-based pressure-sensitive adhesive (a mixture of AD502 and Catalyst CAT10L, either manufactured by Toyo-Morton, Ltd., at a mix ratio of 9/1): 20 parts
Ethyl acetate: 80 parts

Example 5

The same procedures as in Example 1 were carried out, except that the condition of providing an adhesive layer to a peelable transparent sheet was changed to the condition of forming a primer layer and a dye receptive layer in this order on a peelable transparent sheet under the condition described below, to prepare an intermediate transfer recording medium of Example 5. Other conditions of Example 5 were the same as in Example 1.

A primer layer having the composition described below was formed in a thickness of 0.5 g/$m^2$ measured in dry condition. On the primer layer, a dye receptive layer having the composition described below was further formed in a thickness of 2.5 g/$m^2$ measured in dry condition. Both of the primer and dye receptive layers were applied by gravure coating. In the intermediate transfer recording medium of Example 5, peeling was designed to occur between the layer and the peelable transparent sheet.

(Composition of an Application Solution for Primer Layer)

Vinyl chloride/vinyl acetate copolymer: 10 parts

Polyester resin: 10 parts

Methyl ethyl ketone: 20 parts

Toluene: 50 parts (Composition of an Application Solution for Dye Receptive Layer)

Vinyl chloride/vinyl acetate copolymer: 100 parts

Epoxy-modified silicone: 5 parts

Methyl ethyl ketone/Toluene (a mass ratio of 1/1): 400 parts

Example 6

The same procedures as in Example 1 were carried out, except that the condition of providing an adhesive layer to a peelable transparent sheet was changed to the condition of forming a hologram layer, a reflection layer and an adhesive layer in this order on a peelable transparent sheet under the condition described below, to prepare a film transfer sheet provided with a hologram layer of Example 6. Other conditions of Example 6 were the same as in Example 1. In the film transfer sheet of Example 6, peeling was designed to occur between the layer and the peelable transparent sheet.

An application solution for hologram layer having the composition described below was applied on a peelable transparent sheet by gravure coating so as to have a thickness of 2.0 g/$m^2$ measured in dry condition, and dried to form a hologram layer. The hologram layer was brought into contact with a nickel press plate having a hologram pattern formed thereon, followed by heating and pressing to form an asperity on the hologram layer, thereby forming a relief hologram.

(Composition of an Application Solution for Hologram Layer)

Acrylic resin: 100 parts

Urethane acrylate: 25 parts

Silicone: 1 part

Photopolymerization initiator: 5 parts

Methyl ethyl ketone: 100 parts $TiO^2$ was deposited on the hologram layer by the vacuum deposition method to form a reflection layer having a thickness of 500 Å. On the reflection layer, an adhesive layer was formed further using the application solution for adhesive layer used in Example 1 by gravure coating to form an adhesive layer having a thickness of 2.5 g/$m^2$ measured in dry condition.

Example 7

The same procedures as in Example 6 were carried out, except that the condition of providing an adhesive layer to a peelable transparent sheet was changed to the condition of forming a primer layer and a dye receptive layer on a peelable transparent sheet of Example 5, to prepare an intermediate transfer recording medium of Example 7. In the intermediate transfer recording medium of Example 7, peeling was designed to occur between the layer and the peelable transparent sheet.

Comparative Example 1

The same procedures as in Example 1 were carried out, except that the composition of the application solution for the resin layer of Example 1 was changed to that described below, to prepare a film transfer sheet of Comparative Example 1.

(Composition of an Application Solution for Resin Layer)

Polyurethane-based pressure-sensitive adhesive (a mixture of A969V and Isocyanate cross-linking agent A5, either manufactured by Mitsui Takeda Chemicals Co., Ltd., at a mix ratio of 3/1): 20 parts Ethyl acetate: 80 parts Comparative Example 2

The same procedures as in Example 1 were carried out, except that the composition of the application solution for the resin layer of Example 1 was changed to that described below, to prepare a film transfer sheet of Comparative Example 2.

(Composition of an Application Solution for Resin Layer)

Polyester-based pressure-sensitive adhesive (product name: SEIKABOND E295, manufactured by: Dainichiseika Color & Chemicals Mfg. Co. Ltd.): 20 parts Ethyl acetate: 80 parts Comparative Example 3

The same procedures as in Example 1 were carried out, except that the composition of the application solution for the resin layer of Example 1 was changed to that described below, to prepare a film transfer sheet of Comparative Example 3.

(Composition of an Application Solution for Resin Layer)

Polyester-based pressure-sensitive adhesive (a mixture of SEIKABOND E295 and Isocyanate cross-linking agent C55, either manufactured by Dainichiseika Color & Chemicals Mfg. Co. Ltd., at a mix ratio of 9/2): 20 parts Ethyl acetate: 80 parts Comparative Example 4

The same procedures as in Example 1 were carried out, except that the composition of the application solution for the resin layer of Example 1 was changed to that described below, to prepare a film transfer sheet of Comparative Example 4.

(Composition of an Application Solution for Resin Layer)

Polyester-based pressure-sensitive adhesive (a mixture of AD502 and Catalyst CAT10L, either manufactured by Toyo-Morton, Ltd., at a mix ratio of 9/2): 20 parts Ethyl acetate: 80 parts

[Evaluation of Peelability]

Evaluation of peelability was performed on the film transfer sheets or intermediate transfer recording mediums prepared in the above-mentioned examples, by the following method.

First, the following card substrate was prepared as a transfer-receiving member: a card substrate comprising 100 parts of a polyvinyl chloride (degree of polymerization: 800) compound containing an additive (such as a stabilizer) in about 10%, 10 parts of a white pigment (titanium oxide) and 0.5 part of a plasticizer (DOP). A surface of the card substrate is receptive to dyes, so that the card substrate can be used as a thermal transfer image-receiving sheet solely.

An image was formed on the dye receptive layer of each of the intermediate transfer recording mediums prepared in Examples 5 and 7, by means of an intermediate transfer type card printer (product name: HDP600; manufactured by: Fargo Electronics) and a thermal transfer ribbon for HDP600. Next, the dye receptive layer having the image formed thereon, the primer layer and the peelable transparent sheet were retransferred to the above card under the condition of a heating roller surface temperature of 190° C. and a speed of 3 sec/inch to check the peelability of the intermediate transfer recording medium from the transfer-receiving member.

In the case of the film transfer sheets prepared in Examples 1 to 4, Example 6 and Comparative Examples 1 to 4, a mode was employed in which only the transfer to the card was carried out by means of the film transfer sheet of each example, the card substrate (transfer-receiving member) on which an image was preliminarily formed, and the intermediate transfer type card printer (product name: HDP600; manufactured by: Fargo Electronics). The adhesive layer and peelable transparent sheet of the film transfer sheet were transferred to the card under the condition of a heating roller surface temperature of 190° C. and a speed of 3 sec/inch to check the peelability of the film transfer sheet from the transfer-receiving member.

[Criterion for Evaluation]

Each of the above laminate samples was used to check the peelability of the intermediate transfer recording medium or film transfer sheet from the transfer-receiving member in the printer. The criterion for evaluation of the peelability is as follows:

○: Peeling occurs between the layer and peelable transparent sheet of the intermediate transfer recording medium or film transfer sheet, and the peelability of the intermediate transfer recording medium or film transfer sheet from the transfer-receiving member is stable and excellent.

Δ: Peelability of the film transfer sheet from the transfer-receiving member deteriorates, and there are problems such that the layer is left on the peelable transparent sheet side.

×: Peelability of the film transfer sheet from the transfer-receiving member deteriorates, and there are serious peelability problems such that cohesive failure occurs in the resin layer or the resin layer is peeled off from the sheet substrate.

Table 1 shows evaluation results of the peelability. It also shows measurement results of the storage elastic modulus at 130° C., 140° C. and 150° C. of the pressure-sensitive adhesive used in the resin layer of each example. The storage elastic modulus was measured by means of the aforementioned dynamic viscoelasticity measuring apparatus (product name: ARES; manufactured by: TA Instruments Japan). The measurement condition is as follows:

Parallel plate: p 8 mm

Frequency: 1.0 rad/s

Range of measurement temperature: 30 to 200° C. Rate of temperature increase: 2.0° C./min Strain: 0.1%

TABLE 1

| | | Storage Elastic Modulus (Pa) | | |
|---|---|---|---|---|
| | Peelability | 130° C. | 140° C. | 150° C. |
| Example 1 | ○ | $5.63 \times 10^5$ | $5.20 \times 10^5$ | $4.93 \times 10^5$ |
| Example 2 | ○ | $6.86 \times 10^5$ | $6.75 \times 10^5$ | $6.73 \times 10^5$ |
| Example 3 | ○ | $9.13 \times 10^5$ | $9.21 \times 10^5$ | $9.36 \times 10^5$ |
| Example 4 | ○ | $5.96 \times 10^5$ | $4.65 \times 10^5$ | $3.74 \times 10^5$ |
| Example 5 | ○ | $5.63 \times 10^5$ | $5.20 \times 10^5$ | $4.93 \times 10^5$ |
| Example 6 | ○ | $5.63 \times 10^5$ | $5.20 \times 10^5$ | $4.93 \times 10^5$ |
| Example 7 | ○ | $5.63 \times 10^5$ | $5.20 \times 10^5$ | $4.93 \times 10^5$ |
| Comparative Example 1 | x | $2.06 \times 10^5$ | $1.95 \times 10^5$ | $1.86 \times 10^5$ |
| Comparative Example 2 | x | $2.69 \times 10^3$ | $2.10 \times 10^3$ | $1.59 \times 10^3$ |
| Comparative Example 3 | Δ | $1.37 \times 10^6$ | $1.38 \times 10^6$ | $1.40 \times 10^6$ |
| Comparative Example 4 | x | $1.96 \times 10^6$ | $1.55 \times 10^6$ | $1.24 \times 10^6$ |

In the sample of Examples 5 and 7, in which the transfer-receiving member and the intermediate transfer recording medium were laminated together, the sheet substrate was peeled off to retransfer only the image-formed portion to the transfer-receiving member, thereby forming an image successfully. Upon retransferring, a portion of the peelable transparent sheet (the peelable transparent sheet provided with the dye receptive layer) was cut at the half-cut portion as the boundary, forming the structure in which the image-formed portion of the transfer-receiving member was covered with the peelable transparent sheet. Therefore, the peelable transparent sheet functioned as a uniform and strong protective layer, providing the image with very high durability.

In the sample of Examples 1 to 4 and 6, in which the transfer-receiving member and the film transfer sheet were laminated together, the sheet substrate was peeled off, thereby laminating the transfer-receiving member having the image formed thereon with the peelable transparent sheet provided with the adhesive layer. At this time, a portion of the peelable transparent sheet (the peelable transparent sheet provided with the adhesive layer) was cut at the half-cut portion as the boundary, forming the structure in which the image-formed portion of the transfer-receiving member was covered with the peelable transparent sheet. Therefore, the peelable transparent sheet functioned as a uniform and strong protective layer, providing the image with very high durability.

Example 8

The same procedures as in Example 1 were carried out, except that the composition of the application solution for the layer of Example 1 was changed to that described below, to prepare a film transfer sheet of Example 8.

(Composition of an Application Solution for Layer)

Cellulose acetate propionate (product name: CAP-482-0.5, a number average molecular weight of 25,000; manufactured by: Eastman Chemical Company): 10 parts Methyl ethyl ketone: 45 parts Toluene: 45 parts

Example 9

The same procedures as in Example 1 were carried out, except that the composition of the application solution for the layer of Example 1 was changed to that described below, to prepare a film transfer sheet of Example 9.

(Composition of an Application Solution for Layer)

Cellulose acetate butyrate (product name: CAB-551-0.2, a number average molecular weight of 30,000; manufactured by: Eastman Chemical Company): 10 parts Methyl ethyl ketone: 45 parts Toluene: 45 parts Example 10

The same procedures as in Example 1 were carried out, except that the composition of the application solution for the layer of Example 1 was changed to that described below, to prepare a film transfer sheet of Example 10.

(Composition of an Application Solution for Layer)

Cellulose acetate butyrate (product name: CAB-381-0.5, a number average molecular weight of 30,000; manufactured by: Eastman Chemical Company): 10 parts Methyl ethyl ketone: 45 parts Toluene: 45 parts Example 11

The same procedures as in Example 1 were carried out, except that the composition of the application solution for the layer of Example 1 was changed to that described below, to prepare a film transfer sheet of Example 11.

(Composition of an Application Solution for Layer)

Cellulose acetate butyrate (product name: CAB-321-0, a number average molecular weight of 12,000; manufactured by: Eastman Chemical Company): 10 parts Methyl ethyl ketone: 45 parts Toluene: 45 parts Example 12

The same procedures as in Example 5 were carried out, except that the composition of the application solution for the layer of Example 5 was changed to that described below, to prepare an intermediate transfer recording medium of Example 12.

position of an Application Solution for Layer)

Cellulose acetate propionate (product name: CAP-482-0.5, a number average molecular weight of 25,000; manufactured by: Eastman Chemical Company): 10 parts Methyl ethyl ketone: 45 parts Toluene: 45 parts Example 13

The same procedures as in Example 6 were carried out, except that the composition of the application solution for the layer of Example 6 was changed to that described below, to prepare a film transfer sheet provided with a hologram layer of Example 13.

(Composition of an Application Solution for Layer)

Cellulose acetate propionate (product name: CAP-482-0.5, a number average molecular weight of 25,000; manufactured by: Eastman Chemical Company): 10 parts Methyl ethyl ketone: 45 parts Toluene: 45 parts Example 14

The same procedures as in Example 7 were carried out, except that the composition of the application solution for the layer of Example 7 was changed to that described below, to prepare an intermediate transfer recording medium provided with a hologram layer of Example 14.

(Composition of an Application Solution for Layer)

Cellulose acetate propionate (product name: CAP-482-0.5, a number average molecular weight of 25,000; manufactured by: Eastman Chemical Company): 10 parts Methyl ethyl ketone: 45 parts Toluene: 45 parts Example 15

The same procedures as in Example 3 were carried out, except that the composition of the application solution for the layer of Example 3 was changed to that described below, to prepare a film transfer sheet of Example 15.

(Composition of an Application Solution for Layer)

Cellulose acetate propionate (product name: CAP-482-0.5, a number average molecular weight of 25,000; manufactured by: Eastman Chemical Company): 10 parts Methyl ethyl ketone: 45 parts Toluene: 45 parts Example 16

The same procedures as in Example 4 were carried out, except that the composition of the application solution for the layer of Example 4 was changed to that described below, to prepare a film transfer sheet of Example 16.

(Composition of an Application Solution for Layer)

Cellulose acetate propionate (product name: CAP-482-0.5, a number average molecular weight of 25,000; manufactured by: Eastman Chemical Company): 10 parts Methyl ethyl ketone: 45 parts Toluene: 45 parts Example 17

The same procedures as in Example 15 were carried out, except that the condition of providing an adhesive layer to a peelable transparent sheet was changed to the condition of forming a primer layer and a dye receptive layer on a peelable transparent sheet of Example 5, to prepare an intermediate transfer recording medium of Example 17. In the intermediate transfer recording medium of Example 17, peeling was designed to occur between the layer and the peelable transparent sheet.

Example 18

The same procedures as in Example 16 were carried out, except that the condition of providing an adhesive layer to a peelable transparent sheet was changed to the condition of forming a primer layer and a dye receptive layer on a peelable transparent sheet of Example 5, to prepare an intermediate transfer recording medium of Example 18. In the intermediate transfer recording medium of Example 18, peeling was designed to occur between the layer and the peelable transparent sheet.

Evaluation of peelability was performed on the film t sr sheets or intermediate transfer recording mediums of Examples 8 to 18 in the same manner as the above. As a result, in all cases, it was found that peeling occurred between the layer and peelable transparent sheet of the intermediate transfer recording medium or film transfer sheet, and peelability of the intermediate transfer recording medium or film transfer sheet from the transfer-receiving member was stable and excellent. Furthermore, when the intermediate transfer recording medium or film transfer sheet was transferred to the transfer-receiving member, there was no heat fusing of the card (transfer-receiving member) with a surface of an exposed portion of the layer, which was exposed after an outer frame portion of the transfer recording medium or film transfer sheet was peeled off, and they were peeled off from each other successfully.

What is claimed is:

1. A film transfer sheet comprising a sheet substrate provided with a layer via a resin layer and a peelable transparent sheet provided with an adhesive layer, in which the film transfer sheet has a structure in which the resin layer, the layer, the peelable transparent sheet, and the adhesive layer are laminated in this order on one surface of the sheet substrate and peeling is designed to occur between the layer and the peelable transparent sheet so as to transfer the peelable transparent sheet provided with the adhesive layer to a transfer-receiving member, wherein the resin layer comprises as an essential component a pressure-sensitive adhesive having a storage elastic modulus of $3.0\times10^5$ Pa to $1.2\times10^6$ Pa at a temperature of 130° C. to 150° C., wherein the layer comprises a thermoplastic resin and as an essential component at least one of cellulose acetate propionate having a number average molecular weight of 10,000 to 30,000 and cellulose acetate butyrate having a number average molecular weight of 10,000 to 30,000.

2. The film transfer sheet according to claim 1, wherein the peelable transparent sheet provided with the adhesive layer is provided with a hologram layer.

3. An intermediate transfer recording medium comprising a sheet substrate provided with a layer via a resin layer and a peelable transparent sheet provided with a dye receptive layer, in which the intermediate transfer recording medium has a structure in which the resin layer, the layer, the transparent sheet and the dye receptive layer are laminated in this order on one surface of the sheet substrate and peeling is designed to occur between the layer and the peelable transparent sheet so as to transfer the peelable transparent sheet provided with the dye receptive layer to a transfer-receiving member, wherein the resin layer comprises as an essential component a pressure-sensitive adhesive having a storage elastic modulus of $3.0\times10^5$ Pa to $1.2\times10^6$ Pa at a temperature of 130° C. to 150° C., wherein the layer comprises a thermoplastic resin and as an essential component at least one of cellulose acetate propionate having a number average molecular weight of 10,000 to 30,000 and cellulose acetate butyrate having a number average molecular weight of 10,000 to 30,000.

4. The intermediate transfer recording medium according to claim 3, wherein the peelable transparent sheet provided with the dye receptive layer is provided with a hologram layer.

5. The film transfer sheet according to claim 1, wherein the peelable transparent sheet is a polyethylene terephthalate film having a thickness of 10 to 40 μm.

6. The intermediate transfer recording medium according to claim 3, wherein the peelable transparent sheet is a polyethylene terephthalate film having a thickness of 10 to 40 μm.

7. The intermediate transfer recording medium according to claim 3, wherein the dye receptive layer comprises a thermally transferred image formed thereon.

* * * * *